US008978684B2

(12) United States Patent  (10) Patent No.: US 8,978,684 B2
McKenzie  (45) Date of Patent: Mar. 17, 2015

(54) WATER KNOCK OUT BOTTLE AND PROCESS FOR MAKING THE SAME

(76) Inventor: Mike McKenzie, Breckenridge, TX (US)

(*) Notice: Subject to any disclaimer, the term of this patent is extended or adjusted under 35 U.S.C. 154(b) by 196 days.

(21) Appl. No.: 13/361,133

(22) Filed: Jan. 30, 2012

(65) Prior Publication Data

US 2012/0193355 A1  Aug. 2, 2012

Related U.S. Application Data

(60) Provisional application No. 61/437,794, filed on Jan. 31, 2011.

(51) Int. Cl.
*F16K 31/18* (2006.01)
*E21B 43/34* (2006.01)

(52) U.S. Cl.
CPC ..................... *E21B 43/34* (2013.01)
USPC ............ 137/15.26; 137/15.08; 137/202; 137/409

(58) Field of Classification Search
USPC ............ 137/389, 202, 203, 587, 590, 433, 137/15.13, 15.08, 15.26, 409; 220/612; 285/136.1, 148.9, 416; 251/148
See application file for complete search history.

(56) References Cited

U.S. PATENT DOCUMENTS

| 214,463 | A | * | 4/1879 | Smith | 137/202 |
| 577,251 | A | * | 2/1897 | Grundy | 285/136.1 |
| 1,086,215 | A | * | 2/1914 | Porter | 137/202 |
| 1,179,344 | A | * | 4/1916 | Burns et al. | 137/202 |
| 1,324,597 | A | * | 12/1919 | Jansen, Jr. | 137/590 |
| 1,325,603 | A | * | 12/1919 | Anderson | 137/590 |
| 2,127,269 | A | * | 8/1938 | Robinson | 220/612 |
| 2,322,488 | A | * | 6/1943 | Uecker | 220/612 |
| 2,518,654 | A | * | 8/1950 | Backus | 137/433 |
| 3,516,692 | A | * | 6/1970 | Albrecht | 285/136.1 |
| 4,094,346 | A | * | 6/1978 | Milo | 137/202 |
| 4,185,857 | A | * | 1/1980 | Saracco | 285/416 |
| 6,026,842 | A | * | 2/2000 | Gallant | 137/202 |

* cited by examiner

*Primary Examiner* — Craig Schneider
*Assistant Examiner* — Craig J Price
(74) *Attorney, Agent, or Firm* — Jonathan Szarzynski; Szarzynski PLLC

(57) ABSTRACT

Apparatus for stopping fluid flow when liquid is present in the fluid flow. The apparatus generally includes two parts, an internal structure with a float valve, and an external tank. The internal structure includes a plurality of fluid entry holes positioned, sized, and numbered relative to a drain hole. The design is generally thread less, and the preferred process used for making the apparatus includes welding and promotes the conservation of materials.

1 Claim, 4 Drawing Sheets

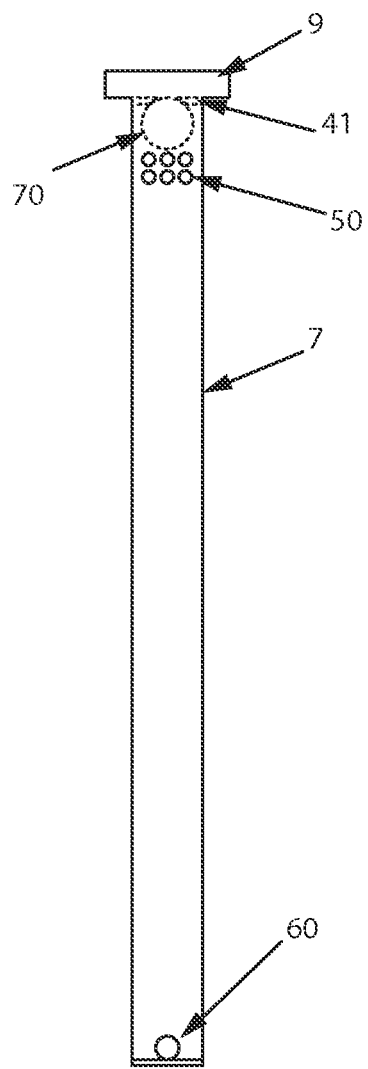
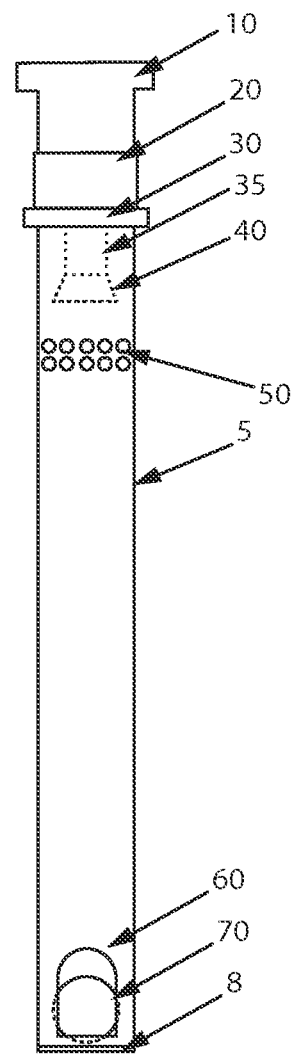
FIG. 2
FIG. 2a

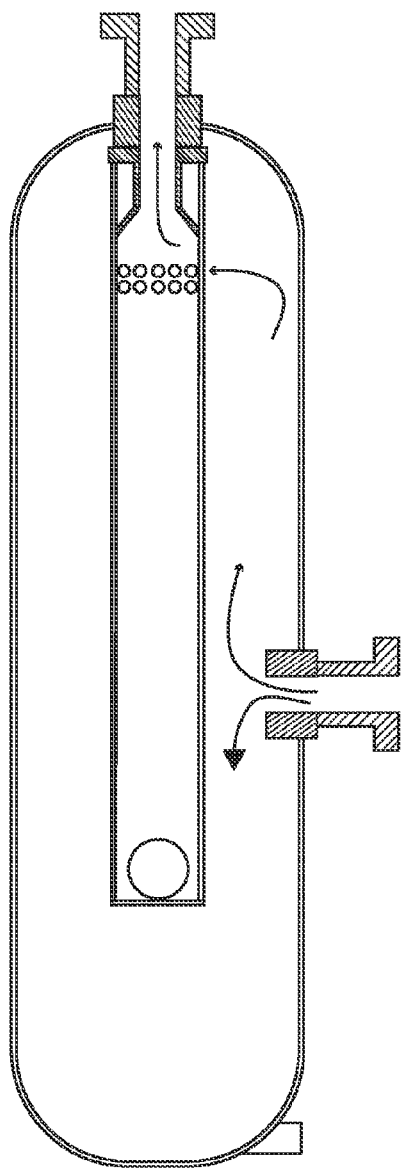
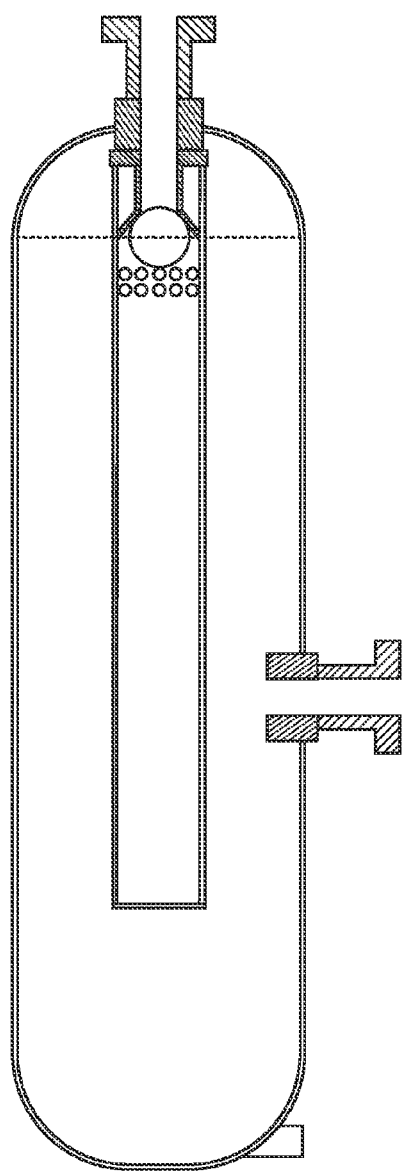
FIG. 3
FIG. 4

WATER KNOCK OUT BOTTLE AND PROCESS FOR MAKING THE SAME

CROSS-REFERENCE TO RELATED APPLICATIONS

This application claims the benefit of provisional application No. 61/437,794, filed on Jan. 31, 2011.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of apparatuses that stop fluid flow when liquid is present in the flow. Specifically, the present invention is ideal for use as a water knock-out bottle in the oil and gas industry. When operating with the forces and pressures of a gas well, threaded solutions tend to fail. What is needed is a welded solution that can be constructed in a cost effective and economical manner.

SUMMARY OF THE INVENTION

The present invention is a generally thread-less automatic shut-off apparatus that stops fluid flow when liquids are present in the flow, and the process that is used to create the apparatus. The apparatus generally comprises two main components: an external tank with an inlet flange and a drain; and an internal float valve with an exit flange. The process includes welding and creating the internal float valve using parts from the creation of the external tank. The internal structure, or float valve, has a particular configuration and size of fluid entry and drain holes.

BRIEF DESCRIPTION OF THE DRAWINGS

FIG. 2 is a side view of the internal float valve;
FIG. 2a is a side view of another embodiment of the internal float valve;
FIG. 3 is a side view cross section of the present invention in a gas-flow state;
FIG. 4 is a side view cross section of the present invention in a shut-off state.

DETAILED DESCRIPTION OF THE INVENTION

Figure 1:
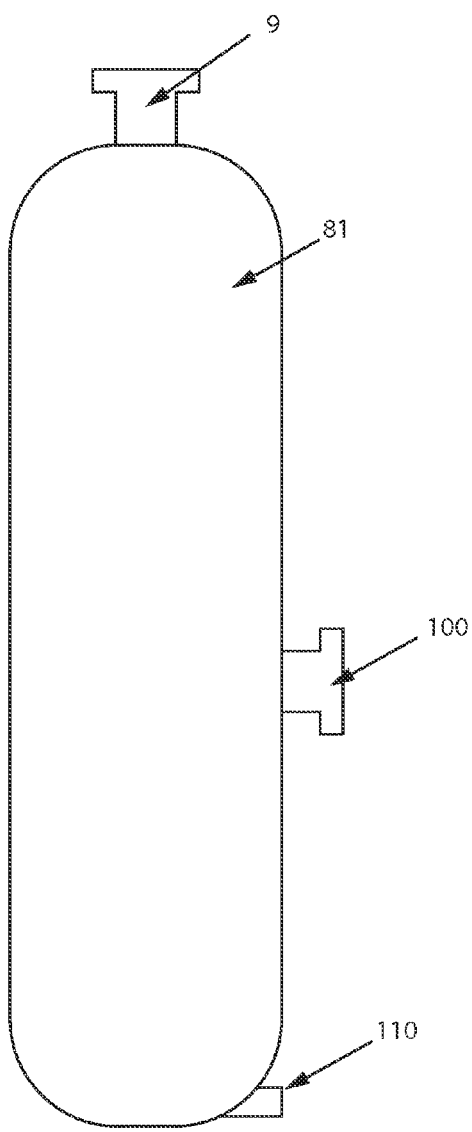
FIG. 1 is a side view of a water knock out bottle.

Referring to the invention in more detail, in FIG. 1 an external view of a shut-off device, or water knock out bottle is shown. In the embodiment shown, outer tank 81 is a continuous piece of rigid material. Welded to tank 81 is an internal structure that is described further in FIGS. 2 and 2a. Flange 100 is welded to tank 81. Tank 81 has an inlet opening that allows for fluid to pass through flange 100 into tank 81. Similarly, tank 81 has a vertical opening that allows for the internal structure to be inserted into tank 81 and welded in place. Either internal structure described in this document may be installed inside of tank 81. Drain 110 is installed in the bottom of tank 81 so that gravity assists the flow of fluid within the tank out of drain 110. Tank 81 has an opening for the installation of drain 110. Drain 110 can be any device that allows for fluid to flow through it, and has the ability to stop the fluid flow via plug, valve, or any other means of stopping fluid flow through an opening.

Figure 1A:
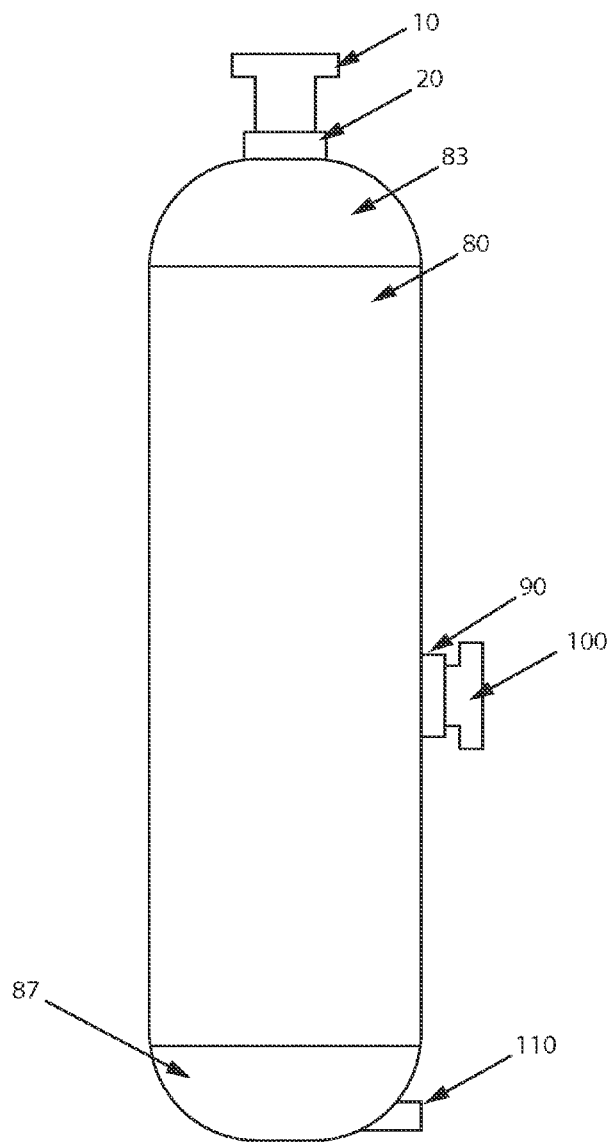
FIG. 1a is a side view of an embodiment of a water knock out bottle.

Referring now to the invention shown in FIG. 1a, the outside of another embodiment of the present invention is shown. In this embodiment, the system is made using commercial off-the-shelf parts. Outer pipe 80 is welded to top cap 83 and bottom cap 87. Pipe 80 has a side-opening for an inlet, and for the installation of entry flange 100. Entry flange 100 can be welded to pipe 80 or, in the preferred embodiment, welded to entry fitting 90. In the preferred embodiment, entry fitting is a commercially available "weldolet." In the latter scenario entry fitting 90 is welded to the side-opening in pipe 80. In his embodiment, entry flange 100 is a 2" 300# flange and is welded to a 2" Diameter×6" weld-o-let fitting (entry fitting 90) that is welded to the side opening of pipe 80.

Still referring to the invention shown in FIG. 1a, drain 110 is installed onto bottom cap 87. Drain 110 may be attached with traditional threads or welded to bottom cap 87. Bottom cap 87 has an opening to allow for fluid to flow out of the apparatus through drain 110, Further, exit flange 10 and coupling 20 are shown. Exit flange 10 and coupling 20 are part of the internal structure shown in FIG. 2a that has been welded to top cap 83. Flange 10 or coupling 20 may be welded to top cap 83, but in the preferred embodiment, coupling 20 is welded to top cap 83.

Referring now to FIG. 2 and FIG. 2a, two separate internal structures are shown. FIG. 2a represents an internal structure that is made with commercial off-the-shelf parts.

Referring now to the invention shown in FIG. 2, internal structure is shown that is made from one continuous piece. The internal s e includes a flange 9 capable of being attached to another flange the is not part of the system, so that the apparatus may be installed in-line in typical gas wells. This is true of all flanges described in this document. The internal structure also includes an elongated cylinder 7. In this embodiment, flange 9 and cylinder 7 are one continuous piece of metal, but they can be separate pieces welded together. Cylinder 7 has an opening at the top. Inside cylinder 7 is seat 41. Seat 41 is configured so that ball 70 cannot pass through flange 9, but fluids can. When ball 70 is in contact with seat 41, a seal is created so that fluid cannot pass through flange 9.

Referring now to FIG. 2a, the internal structure is created using off-the-shelf parts. Exit flange 10 is welded to coupling 20. In the preferred embodiment exit flange 10 is a 2" diameter 300# flange, and coupling 20 is a 2" diameter socket weld coupling. In the preferred embodiment, coupling 20 is welded to bushing 30. Here, bushing 30 is a 2" diameter×1" bushing. Bushing 30 is welded to nipple 35. Here, nipple 35 is threaded so that female union 40 may be attached to nipple 35 using threads. However, the invention is not limited by the use of threads, as nipple 35 may be welded to female union 40. In the embodiment shown in FIG. 2a, Female union 40 is a 1" diameter threaded female union, and nipple 5 is a 1" Diameter by 4" threaded nipple. Also welded to bushing 30 is internal pipe 5. In the preferred embodiment, internal pipe 5 has a 2" diameter. Finally, the bottom of internal pipe 5 is sealed by seal means 8. In the preferred embodiment, seal means 8 is a 2" diameter circular piece of metal welded to the bottom of internal pipe 5.

Referring to FIGS. 2 and 2a, top holes 50 are cut out of cylinder 7 and internal pipe 5 so that fluids can enter the internal structure. In the embodiment shown in FIG. 2a, there are two rows of 9½" holes for a total of 18 holes that are installed so that the center line between the rows of holes is 6" below bushing 30. Further, bottom hole 60, also called a drain hole, is cut out of cylinder 7 so that liquid can escape the internal structure when the liquid is drained from the system via d 110. In the preferred embodiment hole 60 is a ½ hole. Through experimentation, the optimal ratio of bottom hole 60 over top holes 50 was found to be approximately 1/18. This ratio allows for gas to flow through the internal structure without disturbing float 70. As the ration becomes larger, gas entering through bottom hole 60 may push float 70 into its seat and stop fluid flow when water is not present. When claimed, the size of openings me s the surface area of the space of the openings. The size of all top openings means the combined surface area of all top openings.

Still referring to FIGS. 2 and 2a, in the preferred embodiment, float 70 is a ball that has a specific gravity of slightly less than one. In the preferred embodiment, float 70 is stainless steel, or some other type of material that resists corrosion. Further, in the embodiment shown in FIG. 2a, float 70 has a diameter of 1¾", so that it is just slightly smaller than a 2" diameter internal pipe 5.

Referring now to FIG. 3 a cross section of a water knock out bottle is shown. The present invention uses gravity and buoyancy to operate, FIG. 3 shows the systems gas-flow state, where the smaller arrows depict gas flowing through the inlet, traveling through small holes and exiting the device. The larger arrow depicts liquid entering the system and travelling to the bottom of the apparatus due to the force of gravity.

Referring now to FIG. 4, the present invention is shown in its shut-off state. Here, liquid has entered the apparatus; float 70 has travelled upwards and created a seal between float 70 and seat 41. In this figure, seat 41 is female union 40. When the system is in its shut-off state, fluid flow is stopped, and will continue to be stopped until drain means 110 is engaged to allow for fluid to exit the system.

Figure 5:
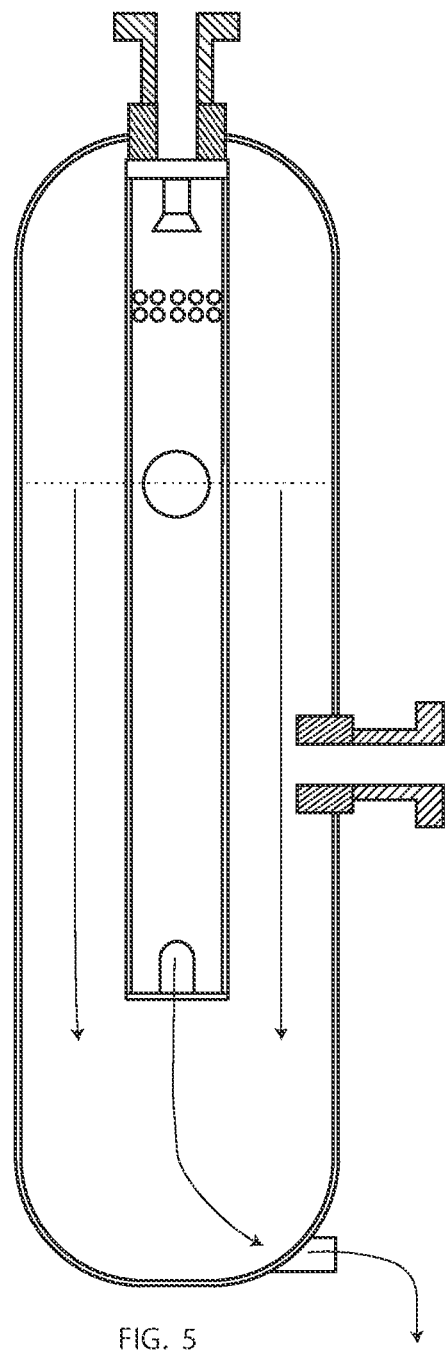
FIG. 5 is a side view cross section of the present invention in a drain state.

Referring now to the invention shown in FIG. 5, drain 110 is engaged. The liquid level is represented by a dashed line, and the arrows represent the direction of the fluid flow. Fluid drains out of drain means 110, and the system returns to its gas-flow state shown in FIG. 3. Drain means 110 is returned to its closed state so that fluid cannot escape vie drain means 110.

The advantages of the present invention include, without limitation, a generally thread-less solution for water knock out bottles used in the oil and gas industry. A thread-less solution is less likely to fail during its service.

In broad embodiment, the present invention is a generally thread-less apparatus that ensures that only gas flows through it, and stops fluid flow when liquid flows into the apparatus. Further, the present invention is a process of making a generally thread-less apparatus that ensures that only gas flows through it, and stops fluid flow when liquid flows into it. The process relies on welding instead of using threaded parts.

While the foregoing written description of he invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A process for constructing a water knock out bottle comprising the steps of:

determining an outside diameter of a second section of pipe;

removing a section of material from a first weld cap creating a first opening and a first removed section, wherein said opening is slightly larger than said diameter of a second section of pipe, such that said first opening is big enough for said second section of pipe to fit inside said first opening;

welding said first weld cap to a first end of a first section of pipe;

welding said first removed section to one end of said second section of pipe thereby creating a sealed end and an open end of said second section of pipe;

adding an inlet to said first section of pipe;

welding a flange to said inlet;

creating a drain opening and a plurality of gas entry openings for said second section of pipe;

inserting a float into said second section of pipe;

welding an assembly to said open end of said second section of pipe wherein said assembly includes a seat for said float, and the assembly is positioned such that said seat is inside said second section of pipe;

positioning said second section of pipe inside said first section of pipe;

welding said second section of pipe to said first weld cap;

welding a second weld cap to the opposite end of said first end of said first section of pipe; and, adding a drain valve to said second weld cap.

* * * * *